(12) United States Patent
Hammitt

(10) Patent No.: US 11,625,311 B2
(45) Date of Patent: Apr. 11, 2023

(54) USER INTERACTION FOR DETERMINING ATTENTION

(71) Applicant: Beseeq, Burlingame, CA (US)

(72) Inventor: Mark K. Hammitt, Burlingame, CA (US)

(73) Assignee: Beseeq, Burlingame, CA (US)

( * ) Notice: Subject to any disclaimer, the term of this patent is extended or adjusted under 35 U.S.C. 154(b) by 0 days.

(21) Appl. No.: 16/903,222

(22) Filed: Jun. 16, 2020

(65) Prior Publication Data

US 2020/0394116 A1 Dec. 17, 2020

Related U.S. Application Data

(60) Provisional application No. 62/862,462, filed on Jun. 17, 2019.

(51) Int. Cl.
| | |
|---|---|
| *G06F 11/34* | (2006.01) |
| *G06F 11/30* | (2006.01) |
| *G06F 3/04817* | (2022.01) |
| *G06F 3/04842* | (2022.01) |
| *G06F 9/451* | (2018.01) |
| *G06F 3/01* | (2006.01) |
| *G06F 3/0488* | (2022.01) |

(52) U.S. Cl.
CPC ............ *G06F 11/3438* (2013.01); *G06F 3/01* (2013.01); *G06F 3/017* (2013.01); *G06F 3/0488* (2013.01); *G06F 3/04817* (2013.01); *G06F 3/04842* (2013.01); *G06F 9/451* (2018.02); *G06F 11/3041* (2013.01)

(58) Field of Classification Search
None
See application file for complete search history.

(56) References Cited

U.S. PATENT DOCUMENTS

| | | | | |
|---|---|---|---|---|
| 4,813,682 | A * | 3/1989 | Okada | A63F 13/04 463/5 |
| 11,003,839 | B1 * | 5/2021 | Hatch | G06F 40/166 |

(Continued)

FOREIGN PATENT DOCUMENTS

WO WO-2014102698 A1 * 7/2014 ............ G06F 17/212

OTHER PUBLICATIONS

Nintendo, "Duck Hunt," 1984, https://www.youtube.com/watch?v=J3sfsP9W048.*

(Continued)

*Primary Examiner* — Ryan Barrett
(74) *Attorney, Agent, or Firm* — Schwegman Lundberg & Woessner, P.A.

(57) ABSTRACT

Disclosed are systems, methods, and non-transitory computer-readable media for determining attention based on user interactions. While content is being presented by a client device, an attention determination system causes presentation of a prompt object on a display of the client device. The prompt object starts from an entry point and traverses a path across the display. While the prompt object is traversing the path across the display, the attention determination system detects a user input at a point on the display that is within a threshold distance of a current position of the prompt object along the path. The attention determination system determines an attention level of a user of the client device based on the user input.

16 Claims, 18 Drawing Sheets

(56) References Cited

U.S. PATENT DOCUMENTS

| | | | | |
|---|---|---|---|---|
| 2002/0116266 | A1* | 8/2002 | Marshall | G06Q 30/02 |
| | | | | 705/14.14 |
| 2009/0094518 | A1* | 4/2009 | Lawther | G06F 3/04817 |
| | | | | 715/716 |
| 2009/0273687 | A1* | 11/2009 | Tsukizawa | G06T 7/74 |
| | | | | 348/222.1 |
| 2015/0091811 | A1* | 4/2015 | Hombert | H04M 1/67 |
| | | | | 345/173 |
| 2017/0171620 | A1* | 6/2017 | Oren | H04N 21/44226 |
| 2018/0008893 | A1* | 1/2018 | Katagai | G06F 3/04895 |
| 2018/0271364 | A1* | 9/2018 | Orlosky | A61B 5/4082 |
| 2019/0076736 | A1* | 3/2019 | Timm | A63F 13/26 |
| 2020/0084490 | A1* | 3/2020 | Largman | G06F 9/451 |

OTHER PUBLICATIONS

Nintendo, "Duck Hunt Instruction Booklet," 1985, http://www.thealmightyguru.com/Wiki/images/6/6b/Duck_Hunt_-_NES_-_Manual.pdf.*

Hawkins et al., "Dynamic Difficulty Balancing for Cautious Players and Risk Takers," International Journal of Computer Games Technology, vol. 2012, Article ID 625476, https://doi.org/10.1155/2012/625476.*

Chen, "Object-based attention: A tutorial review," Jun. 7, 2012, Attention, Perception, & Psychophysics vol. 74, pp. 784-802 (2012), https://doi.org/10.3758/s13414-012-0322-z.*

* cited by examiner

Table I: Response times (secs)

| User | attention levels 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| a | 5 | 3 | 10 | 4 | tod | no-tod | 0 | 2 | 0 | tod | 4 | 8 | 2 | 3 |
| b | 2 | 3 | 3 | 2 | 1 | 4 | 3 | 3 | 2 | 2 | 3 | 1 | 2 | 2 |
| c | 7 | tod | 7 | tod | 4 | 8 | 10 | tod | no-tod | tod | 8 | 4 | 8 | 7 |
| d | tod | tod | tod | tod | tod | tod | tod | tod | tod | tod | tod | tod | tod | tod |
| e | 0.5 | 0.5 | 0.5 | 0.5 | 0.5 | 0.5 | 0.5 | 0.5 | 0.5 | 0.5 | 0.5 | 0.5 | 0.5 | 0.5 |

Table II: Incremental scores (secs)

| User | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| a | 0.5 | 4 | -4.5 | 1.5 | -8 | -1.5 | 3.5 | 2.5 | 3.5 | -8 | 1.5 | -2.5 | 3.5 | 2.5 |
| b | 3.5 | 2.5 | 2.5 | 3.5 | 3 | 1.5 | 2.5 | 2.5 | 3.5 | 3.5 | 2.5 | 4 | 3.5 | 3.5 |
| c | -1.5 | -8 | -1.5 | -8 | 1.5 | -2.5 | -4.5 | -8 | -1.5 | -8 | -2.5 | 1.5 | -2.5 | -1.5 |
| d | -8 | -8 | -8 | -8 | -8 | -8 | -8 | -8 | -8 | -8 | -8 | -8 | -8 | -8 |
| e | 4 | 4 | 4 | 4 | 4 | 4 | 4 | 4 | 4 | 4 | 4 | 4 | 4 | 4 |

Table III: Aggregate scores (secs)

| User | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| a | 0.5 | 4.5 | 0 | 1.5 | -6.5 | -8 | -4.5 | -2 | 1.5 | -6.5 | -5 | -7.5 | -4 | -1.5 |
| b | 3.5 | 6 | 8.5 | 12 | 15 | 16.5 | 19 | 21.5 | 25 | 28.5 | 31 | 35 | 38.5 | 42 |
| c | -1.5 | -9.5 | -11 | -19 | -17.5 | -20 | -24.5 | -32.5 | -34 | -42 | -44.5 | -43 | -45.5 | -47 |
| d | -8 | -16 | -24 | -32 | -40 | -48 | -56 | -64 | -72 | -80 | -88 | -96 | -104 | -112 |
| e | 4 | 8 | 12 | 16 | 20 | 24 | 28 | 32 | 36 | 40 | 44 | 48 | 52 | 56 |

Table IV: Normalized aggregate scores

| User | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| a | 1 | 11 | 0 | 4 | -8 | -10 | -4 | 0 | 3 | -2 | -3 | -13 | 0 | 3 |
| b | 9 | 15 | 21 | 30 | 40 | 44 | 50 | 56 | 65 | 74 | 71 | 75 | 78 | 78 |
| c | -3 | -13 | -15 | -25 | -23 | -27 | -34 | -44 | -47 | -57 | -58 | -46 | -48 | -49 |
| d | -19 | -30 | -30 | -40 | -50 | -60 | -70 | -80 | -90 | -100 | -100 | -100 | -100 | -100 |
| e | 10 | 20 | 30 | 40 | 50 | 60 | 70 | 80 | 90 | 100 | 100 | 100 | 100 | 100 |

*FIG. 9*

$$f(x;a,b) = \frac{a}{b}\left(\frac{x}{b}\right)^{a-1} e^{-\left(\frac{x}{b}\right)^a}$$

*FIG. 11*

Table VII: time in seconds until start of attention test

Weibull-derived probabilities:

| Attention Score | Buffer | Max time | 1.4% | 2.7% | 4.7% | 7.7% | 11.5% | 15.5% | 18.8% | 19.2% | 14.5% | 3.5% |
|---|---|---|---|---|---|---|---|---|---|---|---|---|
| new | 45 | 45 | | | | | | | | | | |
| 80 | 15 | 500 | 15 | 63 | 111 | 159 | 207 | 255 | 303 | 351 | 399 | 447 |
| 60 | 15 | 360 | 15 | 49 | 83 | 117 | 151 | 185 | 219 | 253 | 287 | 321 |
| 40 | 15 | 240 | 15 | 37 | 59 | 81 | 103 | 125 | 147 | 169 | 191 | 213 |
| 20 | 15 | 120 | 15 | 25 | 35 | 45 | 55 | 65 | 75 | 85 | 95 | 105 |
| 0 | 15 | 80 | 15 | 22 | 29 | 36 | 43 | 50 | 57 | 64 | 71 | 78 |
| -20 | 15 | 70 | 15 | 20 | 26 | 32 | 38 | 44 | 50 | 56 | 62 | 68 |
| -40 | 15 | 60 | 15 | 19 | 23 | 27 | 31 | 35 | 39 | 43 | 47 | 51 |
| -60 | 15 | 50 | 10 | 13 | 17 | 21 | 24 | 27 | 30 | 33 | 36 | 42 |
| -80 | 10 | 40 | 10 | 13 | 16 | 19 | 22 | 25 | 28 | 31 | 34 | 37 |
| -100 | 10 | 30 | 10 | 12 | 14 | 16 | 18 | 20 | 22 | 24 | 26 | 28 |

Table VIII: Weibull parameters

| parameter | value |
|---|---|
| a | 1.7 |
| b | 4 |

Table IX: Modified Weibull distribution

| x | 0 | 1 | 2 | 3 | 4 | 5 | 6 | 7 | 8 | 9 | Sum |
|---|---|---|---|---|---|---|---|---|---|---|---|
| y(x,a,b) | 0.0063 | 0.1465 | 0.1923 | 0.1868 | 0.1563 | 0.1152 | 0.0770 | 0.0472 | 0.0268 | 0.0142 | 1.0000 |

*FIG. 12*

USER INTERACTION FOR DETERMINING ATTENTION

CROSS-REFERENCE TO RELATED APPLICATIONS

The present application claims the benefit of priority of U.S. Provisional Application No. 62/862,462, filed on Jun. 17, 2019, which is incorporated herein by reference in its entirety.

TECHNICAL FIELD

An embodiment of the present subject matter relates generally to gauging attention and, more specifically, to using user interaction for determining attention.

BACKGROUND

The use of networked computing systems has allowed for many types of transactions to be performed remotely. For example, events such as exams, classes, and meetings that were traditionally conducted in person are now commonly conducted virtually with participants located in remote locations. While this provides for ease of collaboration, the lack of proximity between participants makes it difficult to gauge whether participants are actively paying attention to the event. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 9 shows various statistical tables, according to some example embodiments.

FIG. 11 shows an equation for a Weibull distribution, according to some example embodiments.

FIG. 12 shows more statistical tables, according to some example embodiments.

DETAILED DESCRIPTION

Figure 1:
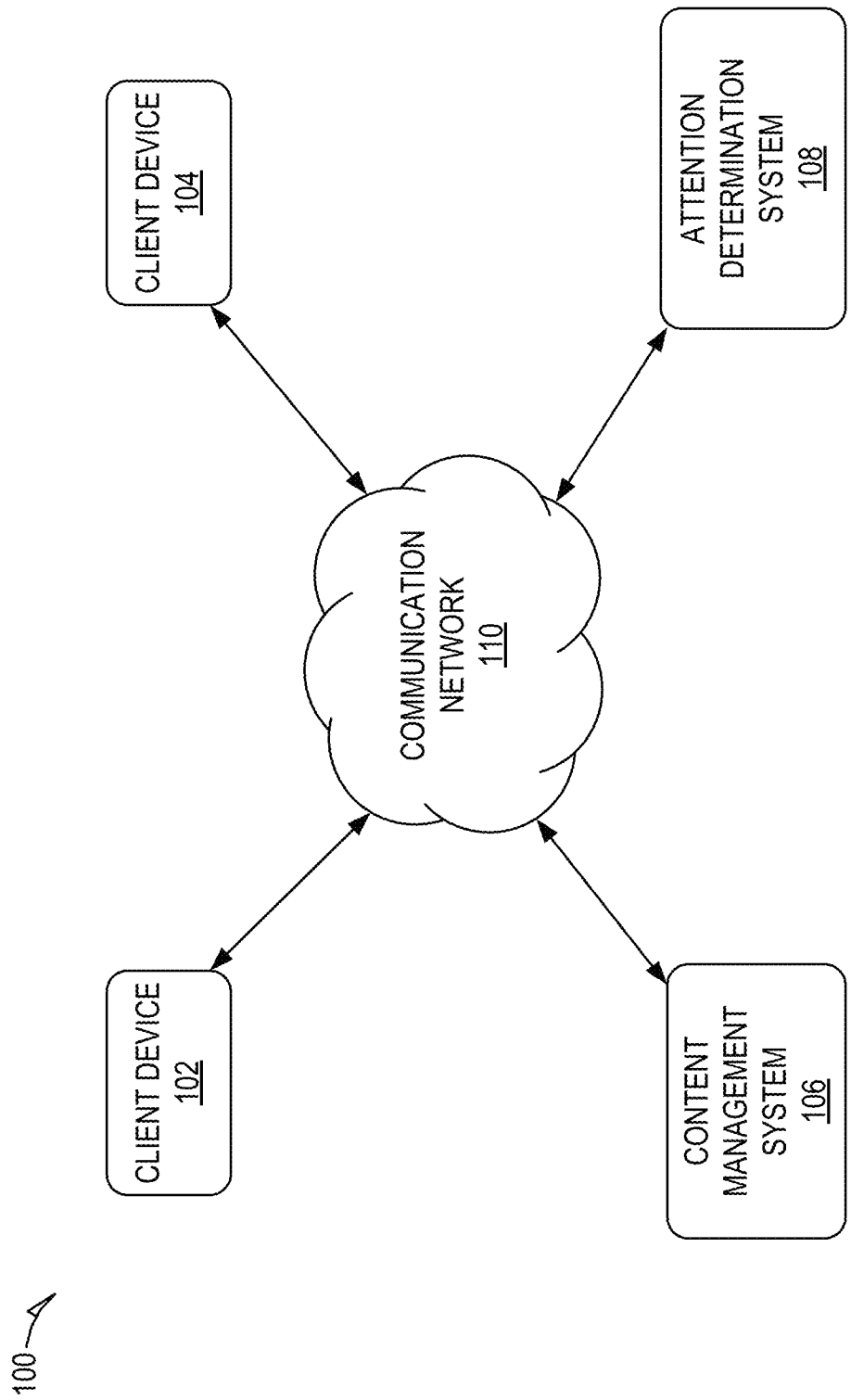
FIG. 1 shows an example system for determining attention based on user interactions, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and computer-readable storage media for determining attention based on user interactions. Gauging user attention can be of critical importance when presenting a user with certain types of content, such as safety related content, educational courses, and the like. For example, ensuring that a new employee is properly paying attention to safety related content can minimize workplace injuries. Similarly, ensuring that a user is properly paying attention to a driver's education course can minimize automobile accidents and increase overall driving safety.

Traditionally, these types of content were administered in-person, such as at a testing center or office, where users could be easily watched to ensure that they were providing proper attention to the presented content. As more tasks are performed virtually, the task of gauging attention has become more difficult. For example, cameras can be used to monitor the users, however this type of solutions requires human users to watch video of many viewers, which can be difficult, particularly when administering content to a large number of users. For example, the view of each user is restricted based on the size of a monitor or other display device. Further, streaming video of multiple users may not be possible given available network resources. Finally, some users may view this type of video monitoring to be a violation of privacy.

To alleviate these issues, an attention determination system employs prompt objects to determine user attention. A prompt object is a digital object that is visually presented over other content and that prompts a user for a specified interaction to indicate that the user is paying attention to the underlying content. For example, the prompt object may be an animation of a honeybee that appears to fly across the display. A user may click on the honeybee to indicate that the user is actively paying attention to the content being presented. The attention determination system may determine the attention level of the user based on whether the specified interaction was performed in response to the user being presented with the prompt object, such as whether the user clicked the honeybee within a specified time period.

The attention determination system may employ several techniques to ensure that a user is not able to automate performance of the specified action when presented with a prompt object. For example, the attention determination system may cause the prompt object to appear at a randomized entry point on the display. Accordingly, a user cannot easily predict where the prompt object will initially appear. The path traversed by the prompt object may also be randomized and include curves and/or changes in direction to further increase the difficulty in predicting the location of the prompt object. The speed at which the prompt object travels along the path may also be varied. For example, the prompt object may accelerate and decelerate as it traverses the path.

The attention determination system generates input data for a user that describes the user's performance when presented with a prompt object. For example, the input data may simply indicate whether a user performed the specified interaction (e.g., clicking the prompt object) for each prompt object presented to the user. The input data may further include additional metadata describing the user's performance, such as data indicating how long it took the user to perform the specified interaction, and the like.

The attention determination system determines an attention level of the user based on the input data for the user. For example, the attention determination system may determine the attention level based on the user's input data gathered during a specified period of time such as during presentation of an underlying content, during the previous month, year, and the like. The attention determination system may determine the attention level using any of a variety of algorithms and/or techniques. For example, the attention level may be based on a determined percentage successful interaction in which the user performed the specified interaction in response to the user being presented with the prompt object. The attention determination system may also provide greater weight to the user's actions in response to the recent prompt objects when determining the attention level.

The determined attention level may be used for any of a variety of uses. For example, the attention level may be used to determine whether a user has provided at threshold level of attention to presented content indicating that the user has properly learned presented material. This may further be used to determine whether the user has successfully completed a course, earned a degree or certificate, earned an award associated with watching the content, and the like.

The attention level of the user may also be used by the attention determination system when presenting prompt objects to a user. For example, the user's attention level may be used to determine a frequency at which prompt objects are presented to the user. This may be based on the user's attention level during presentation of a single content item and/or the user's historical attention level.

FIG. 1 shows an example system 100 for determining attention based on user interactions, according to some example embodiments. As shown, multiple devices (e.g., client device 102, client device 104, content management system 106, and attention determination system 108) are connected to a communication network 110 and configured to communicate with each other through use of the communication network 110. The communication network 110 is any type of network, including a local area network (LAN), such as an intranet, a wide area network (WAN), such as the internet, or any combination thereof. Further, the communication network 110 may be a public network, a private network, or a combination thereof. The communication network 110 is implemented using any number of communication links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1500 shown in FIG. 15.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The content management system 106 is one or more computing devices configured to present content to a user. Content may include any of a variety of types of content, such as video, voice, text, applications, and the like. For example, content may be an education course, training video, exam, advertisement, interactive application, article, and the like.

A user interacts with the content management system 106 via a client-side application installed on the client devices 102 and 104. In some embodiments, the client-side application includes a component specific to the content management system 106. For example, the component may be a stand-alone application, one or more application plug-ins, and/or a browser extension. However, the users may also interact with the content management system 106 via a third-party application, such as a web browser, that resides on the client devices 102 and 104 and is configured to communicate with the content management system 106. In either case, the client-side application presents a user interface (UI) for the user to interact with the content management system 106 to utilize the provided online service. For example, the user interacts with the content management system 106 via a client-side application integrated with the file system or via a webpage displayed using a web browser application.

Although the shown system 100 includes only two client devices 102, 104 and one content management system 106, this is only for ease of explanation and is not meant to be limiting. One skilled in the art would appreciate that the system 100 can include any number of client devices 102, 104 and/or content management system 106. Further, the content management system 106 may concurrently accept connections from and interact with any number of client devices 102, 104. The customer computing system 106 may support connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

The content management system 106 may utilize the functionality of the attention determination system 108 to determine attention levels of users that are presented with content by the content management system 106. Although the content management system 106 and the attention determination system 108 are shown as separate entities, this is just one example and is not meant to be limiting. The functionality of the attention determination system 108 may be partially or completely integrated into the content management system 106 and this disclosure anticipates all such embodiments.

The attention determination system 108 employs prompt objects to determine user attention. A prompt object is a digital object that is visually presented over other content and that prompts a user for a specified interaction to indicate that the user is paying attention to the underlying content. For example, the prompt object may be an animation of a honeybee that appears to fly across the display. The prompt object may be presented with an instruction to click the honeybee to indicate that the user is paying attention to the underlying content. A user may therefore click (e.g., tap, select, and the like) on the honeybee to indicate that the user is actively paying attention to the content being presented.

The attention determination system 108 communicates with the content management system 106 and/or a user's client device 102 to cause presentation of a prompt object. For example, the content management system 106 may notify the attention determination system 108 that content is being presented to a user. The notification may include data identifying the user, such as a unique identifier assigned to the user, as well as data identifying the client device 102 on which the content is being presented.

The attention determination system 108 may then communicate with the user's client device 102 to cause presentation of the prompt object by the client device 102. For example, the attention determination system 108 may provide the client device 102 with animation data for the prompt object as well as test parameters defining presentation of the prompt object. For example, the test parameters may define the entry point, path, speed, specified interaction, time out length, and the like. The client device 102 may cause presentation of the prompt object according to the test parameters received from the attention determination system 108. The client device 102 may also communicate with the attention determination system 108 to provide data indicating the user's interaction with the prompt object, such as whether performed the specified interaction, a time at which the specified interaction was performed, whether a timeout occurred, and the like.

The attention determination system 108 may employ several techniques to ensure that a user is not able to automate performance of the specified action when presented with a prompt object. For example, the attention determination system 108 may cause the prompt object to appear at a randomized entry point on the display, which may be accomplished using an algorithm that randomly generates an entry point for the prompt object. Accordingly, a user cannot easily predict where the prompt object will initially appear.

The attention determination system 108 may similarly vary the path traversed by the prompt object including the curves, changes in direction, changes in speed, and the like. For example, the attention determination system may use algorithms that randomly generate variable for these curves, changes in direction, speed, and the like. These changes to the path and speed further increase the difficulty in predicting the location of the prompt object.

The attention determination system 108 generates input data for a user based on the data received from the client device 102 that describes the user's performance when presented with a prompt object. For example, the input data may indicate whether a user performed the specified interaction (e.g., clicking the prompt object) for each prompt object presented to the user. The input data may further include additional metadata describing the user's performance, such as data indicating how long it took the user to perform the specified interaction, and the like.

The attention determination system 108 determines an attention level of the user based on the input data for the user. For example, the attention determination system 108 may determine the attention level based on the user's input data gathered during a specified period of time such as during presentation of an underlying content, during the previous month, year, and the like. The attention determination system 108 may determine the attention level using any of a variety of algorithms and/or techniques. For example, the attention level may be based on a determined percentage successful interaction in which the user performed the specified interaction in response to the user being presented with the prompt object. The attention determination system 108 may also provide greater weight to the user's actions in response to the recent prompt objects when determining the attention level.

The determined attention level may be used for any of a variety of uses. For example, the attention level may be used by the content management system 106 to determine whether a user has provided a threshold level of attention to presented content indicating that the user has properly learned the presented material. The content management system 106 may also use the determined level of attention of the user to determine whether the user has successfully completed a course, earned a degree or certificate, or earned an award associated with watching the content (e.g., monetary award), to determine the amount of an award to allocate to the user, and the like.

The attention level of the user may also be used by the attention determination system 108 when presenting prompt objects to a user. For example, the user's attention level may be used to determine a frequency at which prompt objects are presented to the user. This may be based on the user's attention level during presentation of a single content item and/or the user's historical attention level.

Figure 2:
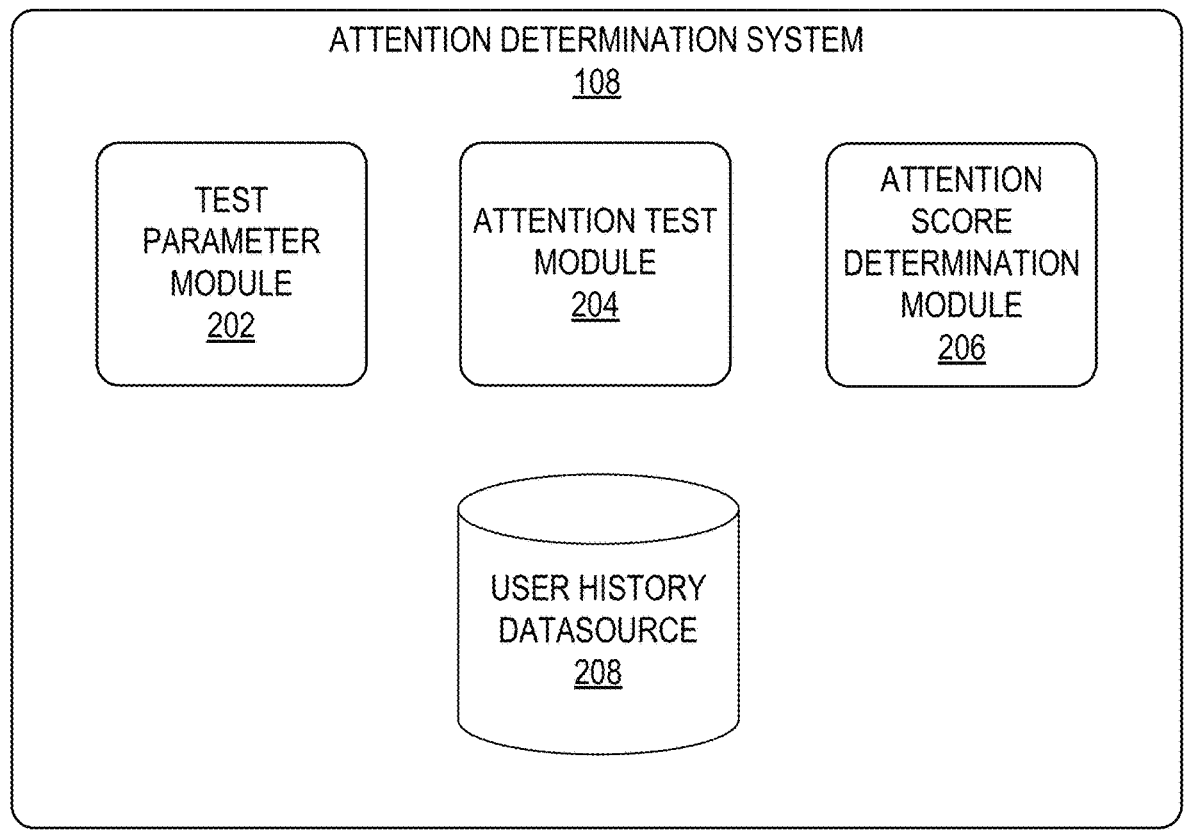
FIG. 2 is a block diagram of an attention determination system, according to some example embodiments.

FIG. 2 shows a block diagram of the attention determination system 108, according to some example, embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the attention determination system 108 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the attention determination system 108 includes a test parameter module 202, an attention test module 204, an attention score determination module 206, and a user history data source 208. The test parameter module 202 manages generation of test parameters for presenting a prompt object to a user. The test parameters define presentation of the prompt object by a client device 102 to test the attention of a user. For example, the test parameters may include data defining the entry point, path, speed, specified interaction, and the like for presenting the prompt object. The test parameter module 202 may generate the test parameters based on user history data associated with the user, such as data describing the user's historical attention level when presented with prompt objects. The test parameter module 202 may gather the user's data from the user history data source 208.

In some embodiments, the test parameter module 202 may generate the test parameters based on a set of a path rules defining specified requirements for presenting the prompt object. For example, the set of path rules may indicate a minimum and/or maximum amount of time that the prompt object is to be presented, portions/regions of the display that the path should traverse, and the like.

The attention test module 204 causes a prompt object to be presented to a user. For example, the attention test module 204 may provide the client device 102 with animation data for the prompt object as well as test parameters defining presentation of the prompt object. The attention test module 204 may also receive data from the client device 102 indicating the user's interaction with the prompt object, such as whether the user performed the specified interaction, a time at which the specified interaction was performed, whether a timeout occurred, and the like.

The attention test module 204 generates input data for a user based on the data received from the client device 102 that describes the user's performance when presented with a prompt object. For example, the input data may indicate whether the user performed the specified interaction (e.g., clicking the prompt object) for each prompt object presented to the user. The input data may further include additional metadata describing the user's performance, such as data indicating how long it took the user to perform the specified interaction, and the like. The attention test module 204 may use the input data to update the user's record in the user history data source 208.

The attention score determination module 206 determines an attention score determines an attention level of the user based on the input data for the user. For example, the attention score determination module 206 may determine the attention level based on the user's input data gathered during a specified period of time such as during presentation of an underlying content, during the previous month, year, and the like. The attention score determination module 206 may determine the attention level using any of a variety of algorithms and/or techniques. For example, the attention level may be based on a determined percentage of interactions in which the user successfully performed the specified interaction in response to the user being presented with the prompt object. The attention score determination module 206 may also provide greater weight to the user's actions in response to the recent prompt objects when determining the attention level.

Figure 3:
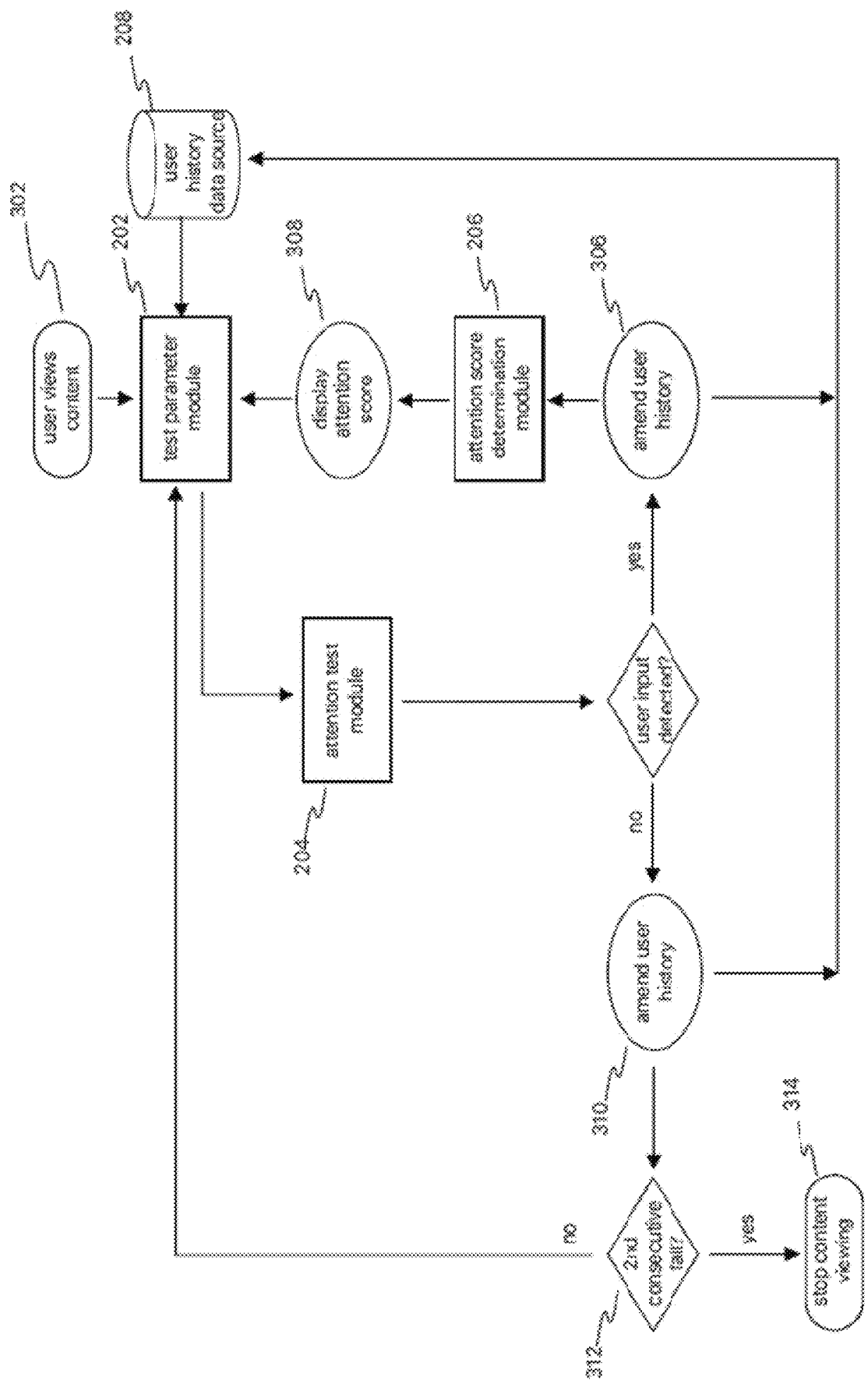
FIG. 3 shows determining attention based on user interactions, according to some example embodiments.

FIG. 3 shows determining attention based on user interactions, according to some example embodiments. As shown, when a user views content 302, the test parameter module 202 reads information about the user, if any, from a user history data source 208. If the user history data source 208 does not contain information about the user, the test parameter module 202 may create a new record for the user in the user history data source 208.

The test parameter module 202, which is described in greater detail below in relation to FIG. 4, produces test parameters used by the attention test module 204. Examples of test parameters include the time interval for the activation of an attention test, the location of the randomized entry point, whether to render an annotation, and characteristics of the path of travel of a prompt object.

The attention test module 204 receives the test parameters from the test parameter module 202 and executes the attention test accordingly. For example, the attention test module 204 communicates with a client device 102 to cause presentation of a prompt object based on the test parameters, such as by providing the client device 102 with animation data for the prompt object as well the test parameters. The client device 102 may then cause presentation of the prompt object based on the received test parameters.

The client device 102 returns data indicating the user's interaction with the prompt object, such as whether the user performed the specified interaction, a time at which the specified interaction was performed, whether a timeout occurred, and the like. The specified interaction may be any type of interaction, such as clicking or otherwise selecting the presented prompt object (e.g., providing a user input within a threshold distance of the prompt object as it traverses the path), pressing a button at a specified time, and the like. Accordingly, the attention test module 204 uses the returned data to determine whether the specified interaction was performed 304.

If the specified interaction was performed, the attention test module 204 amends the user history 306 in the user history data source 208 to reflect that the user successfully performed the specified interaction. This may include data indicating the time it took for the user to perform the specified interaction.

The attention test module 204 may also notify the attention score determination module 206, which may generate an attention score of the user. The attention score determination module 206 may also cause the attention score to be displayed 308 to the user. For example, the attention score determination module 206 may cause the attention score to be displayed on a display of the client device 102.

Alternatively, if the specified interaction was not performed (e.g., a timeout occurred without the occurrence of the specified action), the attention test module 204 will amend the user history 310 in the user history data source 208 to note this failure. In some embodiments, the attention test module 204 may determine whether this is the user's second consecutive failure 312. If this is not the second consecutive failure, the attention test module 204 may communicate with the test parameter module 202 to cause initiation of a subsequent attention test. Alternatively, if the attention test module 204 determines that it is the user's second consecutive failure, the attention test module 204 can cause a stop 314 to presentation of the content to the user. For example, the attention test module 204 may communicate with the content management system 106 to cause the stop.

Figure 4:
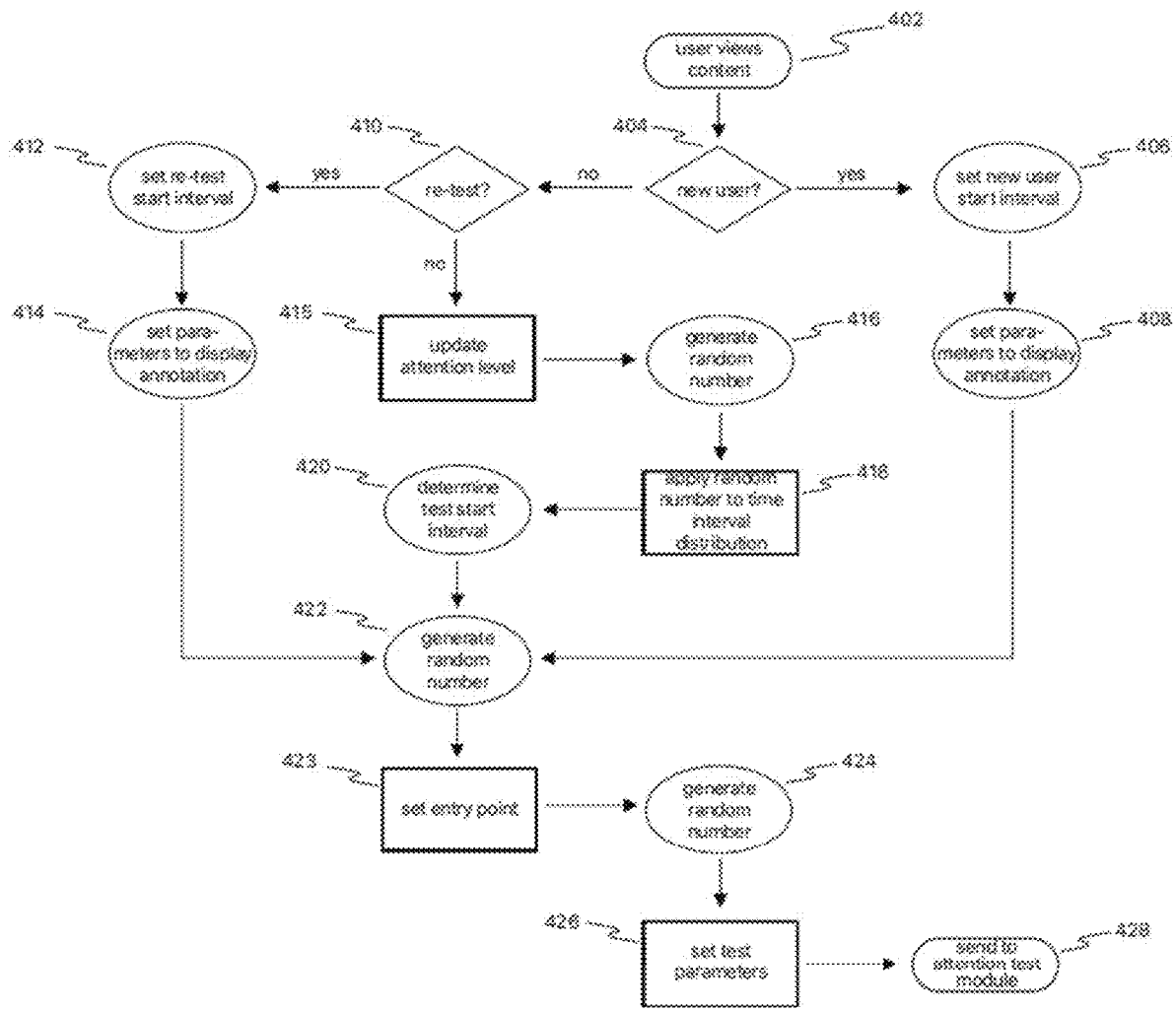
FIG. 4 shows performance of the test parameter module, according to some example embodiments.

FIG. 4 shows performance of the test parameter module 202, according to some example embodiments. When a user views content 402, the test parameter module 202 pulls the users information from the user history data source 208, which the test parameter module 202 uses to determine if the user is new 404. If the user is new, the test parameter module 202 sets a new user start interval 406 and sets parameters to display annotation 408 during the attention test.

If the user is not new, the test parameter module 202 will then check to see if the last attention test failed, indicating whether a re-test 410 should be performed. If a re-test 410 is indicated, the test parameter module 202 will set a re-test time interval 412. For example, the retest time may be relatively short (e.g., 10 seconds). The test parameter module 202 may also set parameters to display an annotation 414 during the re-test.

If the user is not new and a re-test is not indicated, the test parameter module 202 will update the attention level 415 to be consistent with the most recent user history. The test parameter module 202 can then generate a random number 416 and apply random number to time interval distribution 418 appropriate to the attention level, which will be used by the test parameter module 202 to determine the test start interval 420.

In any case, the test parameter module 202 generates a random number 422 in order to set an entry point 423 where the animated prompt object will appear. The test parameter module 202 will then generate another random number 424 in order to set test parameters 426 for the prompt object. The test parameter module 202 then provides 428 the test parameters to the attention test module 204.

Figure 5:
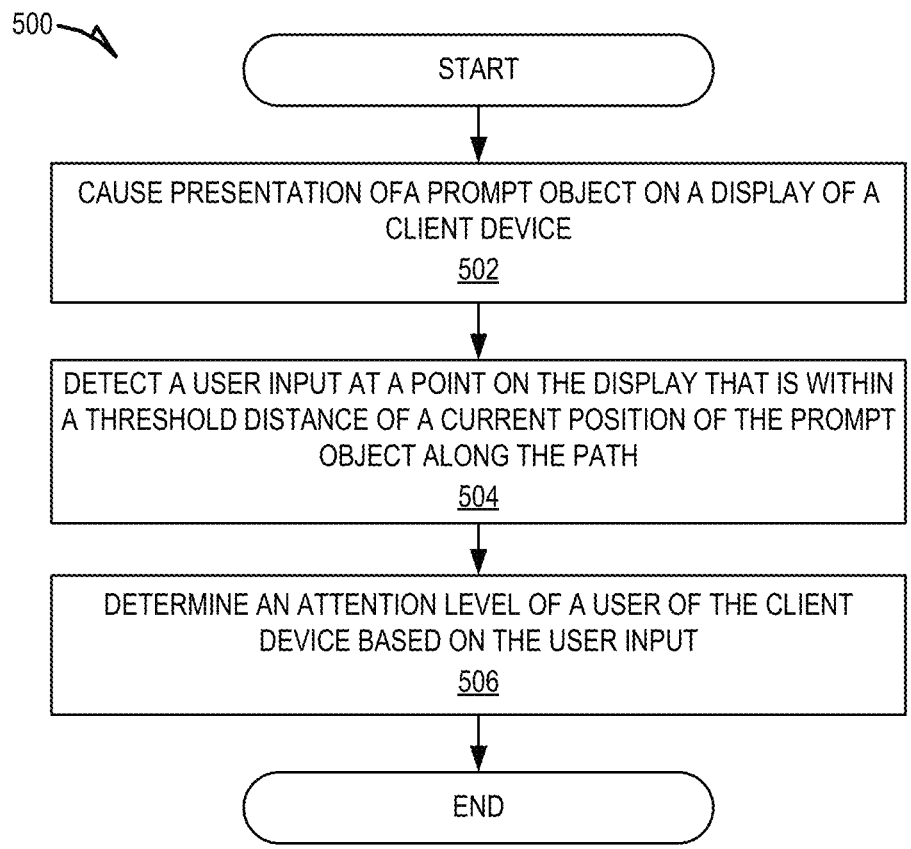
FIG. 5 is a flowchart showing a method for determining attention based on user interactions, according to some example embodiments.

FIG. 5 is a flowchart showing a method 500 for determining attention based on user interactions, according to some example embodiments. The method 500 may be embodied in computer readable instructions for execution by one or more processors such that the operations of the method 500 may be performed in part or in whole by the attention determination system 108; accordingly, the method 500 is described below by way of example with reference thereto. However, it shall be appreciated that at least some of the operations of the method 500 may be deployed on various other hardware configurations and the method 500 is not intended to be limited to the attention determination system 108.

At operation 502, attention determination system 108 causes presentation of a prompt object on a display of a client device 102. The prompt object is presented while the client device 102 is presenting content. The prompt object starts at an entry point and traverse a path across the display. A speed at which the prompt object traverses the path may be variable such that the prompt object traverses a first portion of the path at a first speed and the prompt object traverses a second portion of the path at a second speed that is different than the first speed. The entry point may be determined at random using a random entry point generation algorithm.

At operation 504, the attention determination system 108 detects a user input at a point on the display that is within a threshold distance of a current position of the prompt object along the path. This user input is detected while the prompt object is traversing the path across the display. The attention determination system 108 may detect the user input based on data received from the client device 102.

At operation 506, the attention determination system 108 determines an attention level of a user of the client device 102 based on the user input. For example, the attention determination system 108 may determine, based on the user input and historical user inputs of the user to previously presented prompt objects, a successful response rate of the user to presented prompt objects, and then determine the attention level of the user based on the successful response rate of the user. The attention determination system 108 may use some or all of the user's historical data, such as by determining a subset of historical user inputs of the user that fall within a specified period of time. The successful response rate of the user can be determined based on the subset of historical user inputs.

The attention determination system 108 may repeat this process such as by causing presentation of a subsequent prompt object on the display of the client device 102. The subsequent prompt object may start from a second entry point and traverse a second path across the display that are different than the entry point and the path of a previous prompt object. The path of the previous prompt object and the second path may conform to a defined set of path rules. For example, the set of path rules may define at least a first region of the display through which a generated path is to overlap. In some embodiments, the period of elapsed time between presentation of the prompt object and the subsequent prompt object is based on the attention level of a user.

While the subsequent prompt object is traversing the second path across the display, the attention determination system 108 may determine whether a specified interaction is performed. For example, the attention determination system 108 may detect a second user input at a second point on the display that is within a threshold distance of a current position of the subsequent prompt object along the second path, and determine an updated attention level of the user based on the second user input.

Alternatively, the attention determination system 108 may determine that a timeout occurred in relation to the subsequent prompt object based on a threshold period of time having elapsed without detecting a user input within the threshold distance of the subsequent prompt object as it traversed along the second path. The attention determination system 108 may determine an updated attention level of the user based on occurrence of the timeout.

Figure 6:
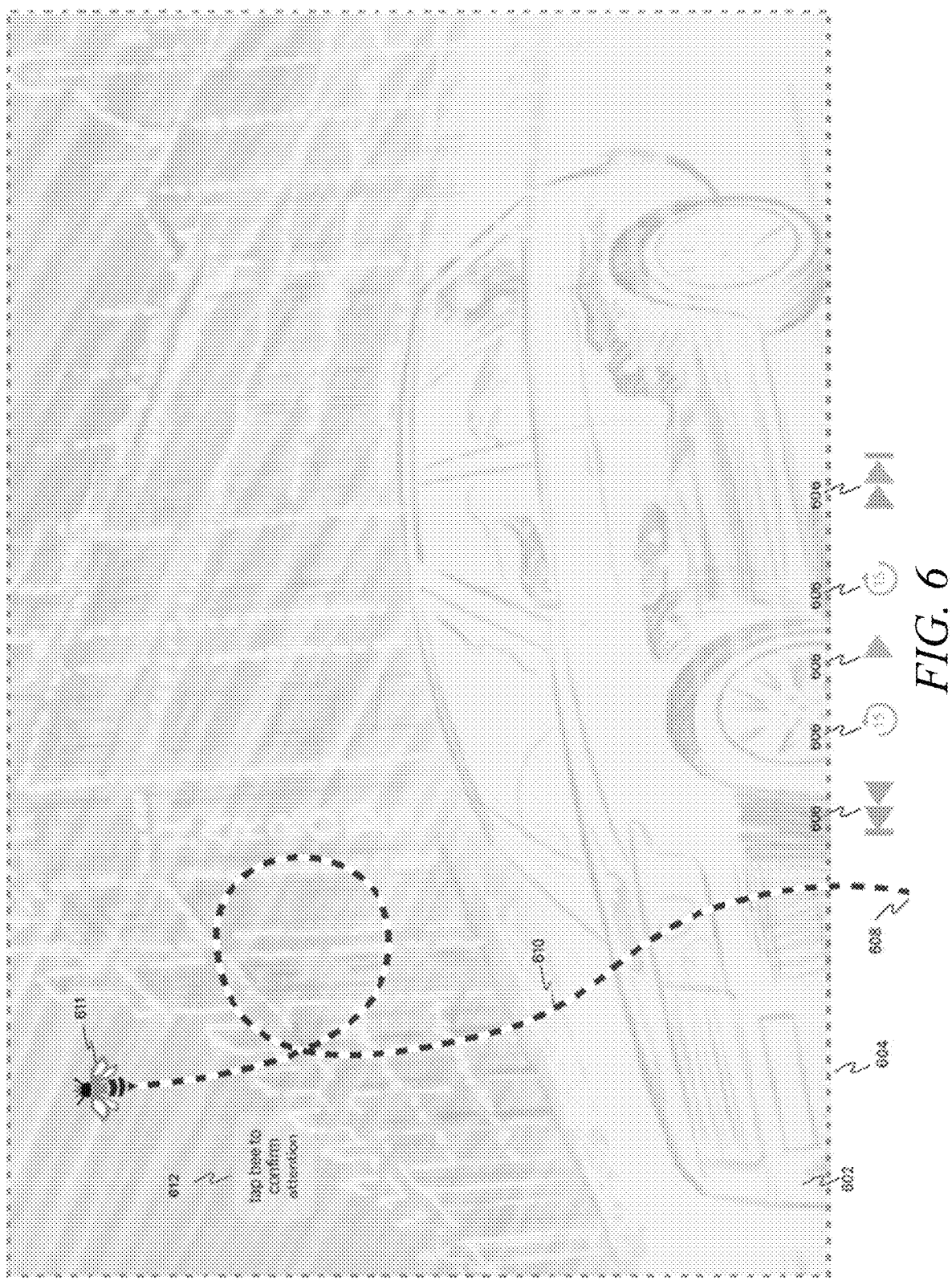
FIG. 6 shows a simplified user interface view of content, according to some example embodiments.

FIG. 6 shows a simplified user interface view of content, according to some example embodiments. As shown, the content is being played back on a tablet computer. The content 602, is a video advertisement for a Sport Utility vehicle (SUV) and is delineated by content display area 604. Below the content display area 604 is a row of standard graphical video playback controls 606. An animated prompt object 611 has traveled over the viewable area of the touch screen, starting at the randomized entry point 608 and following the randomized path of travel 610. Near the prompt object 611 and the randomized path of travel 610 is an annotation 612, which in this case is text that reads, "tap bee to confirm attention."

Figure 7:
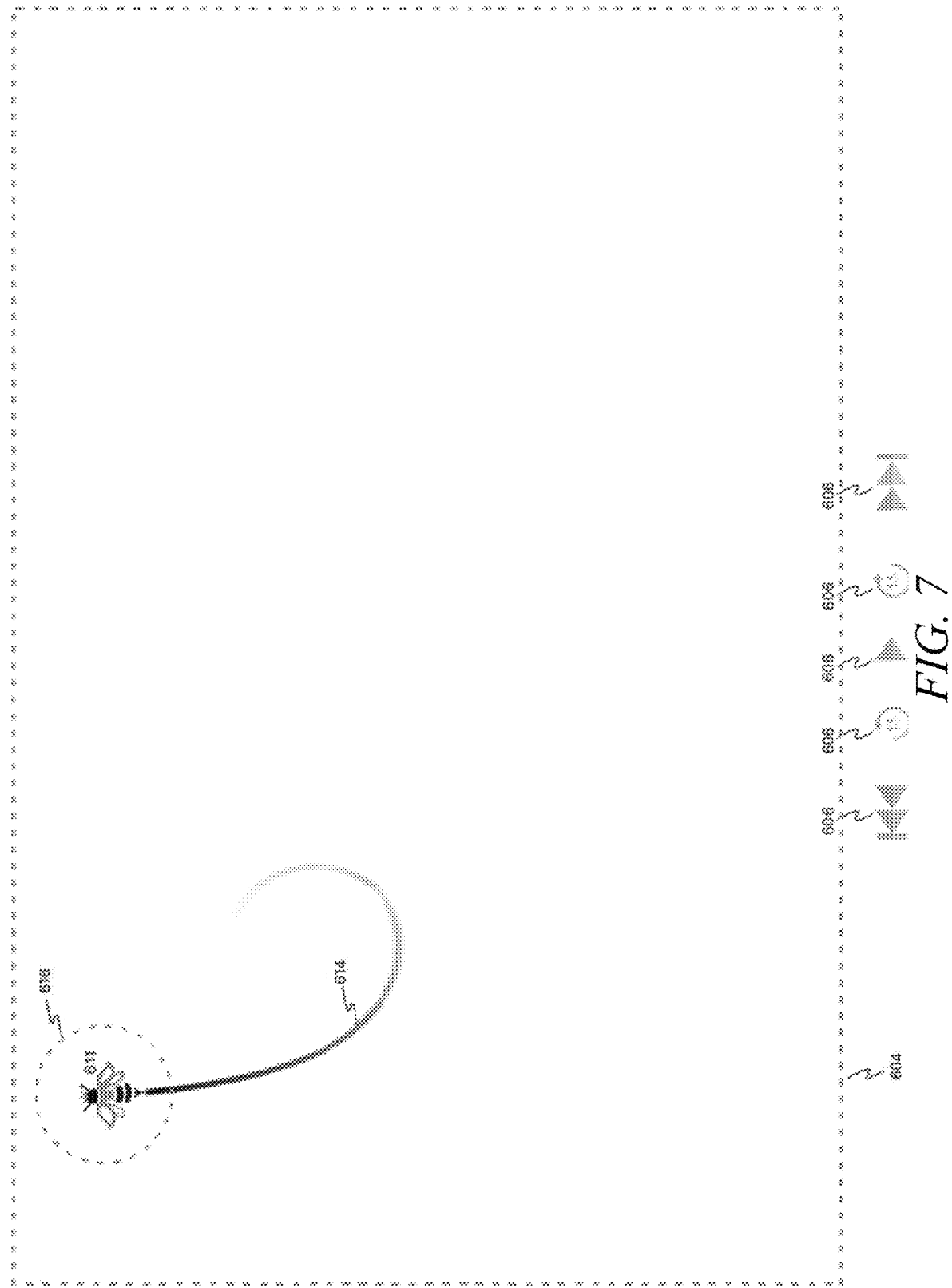
FIG. 7 shows another simplified user interface view of content, according to some example embodiments.

FIG. 7 shows another simplified user interface view of content, according to some example embodiments. As shown, FIG. 7 shows a similar user interface as shown in FIG. 6, but is simplified by removing the content 602, randomized entry point 608, randomized path of travel 610, and annotation 612. A contrail 614 extends a short distance behind the animated prompt object 611. An invisible contact area 616 surrounds and moves with the prompt object 611.

Figure 8:
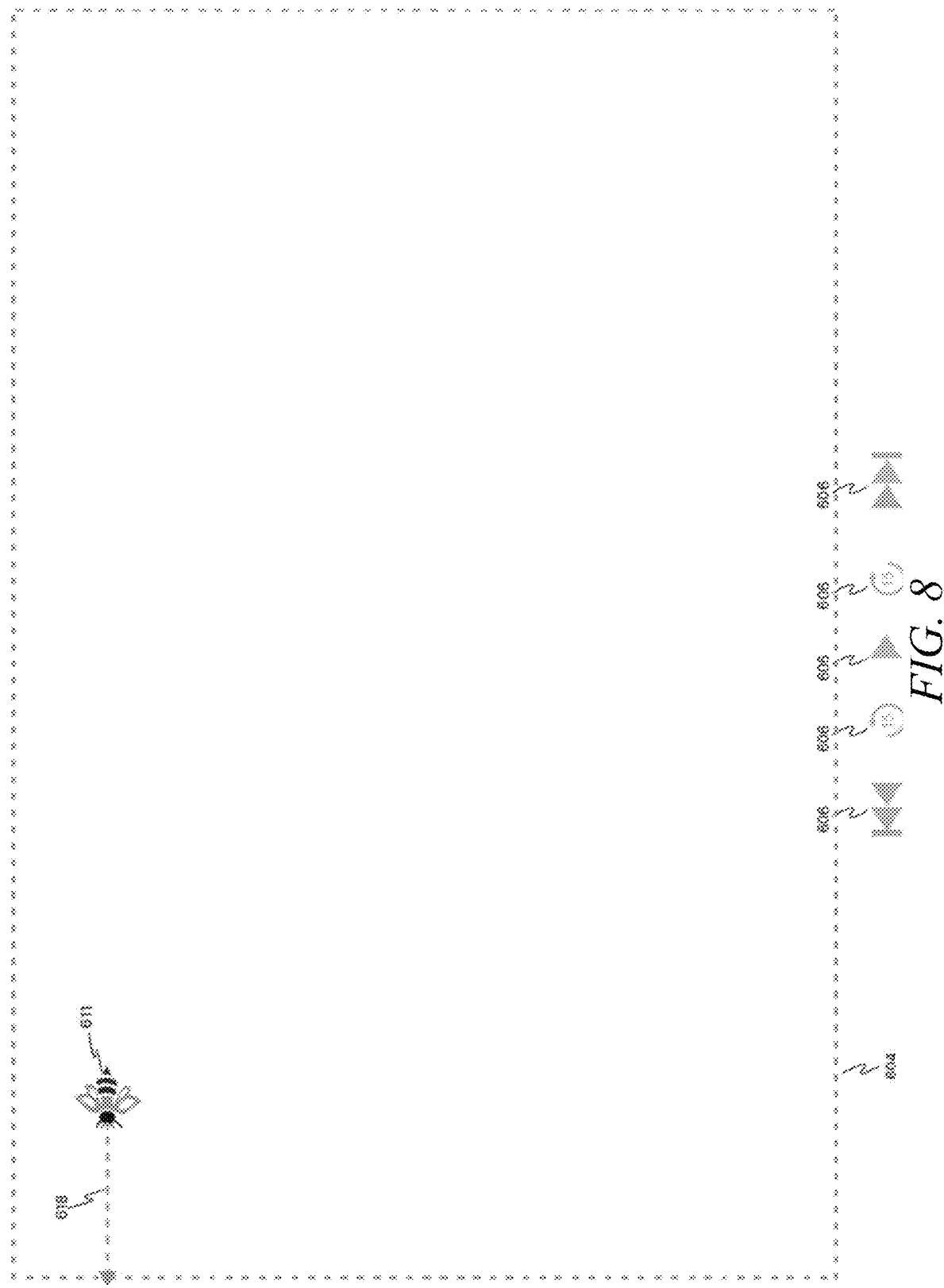
FIG. 8 shows the user interface view during an exit phase, according to some example embodiments.

FIG. 8 shows the user interface view during an exit phase, according to some example embodiments. As shown, the prompt object 611 is traveling in the direction of an exit path 618.

FIG. 9 shows various statistical tables, according to some example embodiments. TABLE I is a table of response times exhibited by five users (a-e) in responding to the appearance of an animated prompt object across successive attention tests. Cells showing "fail" indicate that the user didn't respond at all to the attention test. Cells showing "re-fail" indicate that the user also failed to respond to a second, subsequent attention test performed shortly after an initial failed attention test. A cell showing "fail" that is immediately to the right of a "re-fail" cell show that the user failed the first attention test of a new session that started a prescribed time after a previous session was shut down due to back-to-back attention test failures.

TABLE II is a table of incremental scores. The incremental scores are based on the differences between the response times of TABLE I and an expected response time, within the limits of a maximum gain and maximum loss. The expected response time parameter, along with the maximum gain and maximum loss parameters, are in TABLE V. Time-equivalent penalties for failing or re-failing an attention test are in TABLE VI.

TABLE II is a table of aggregate scores. The aggregate scores are calculated by adding the most recent incremental scores for a given user from TABLE II, up to a maximum number of trailing values specified in TABLE V.

TABLE IV is a table of normalized aggregate scores, which are used in this example as attention scores. Normalized in this example means scaled between 0 and 100 for positive values and 0 and −100 for negative values. In our example, the highest possible aggregate score is 40 and the lowest possible aggregate score is −60, so scaling both negative and positive aggregate scores across equivalent ranges gives relatively greater weight to positive aggregate scores.

TABLE V contains parameters used in TABLE II and TABLE III.

TABLE VI contains penalty parameters used in TABLE II.

Figure 10:
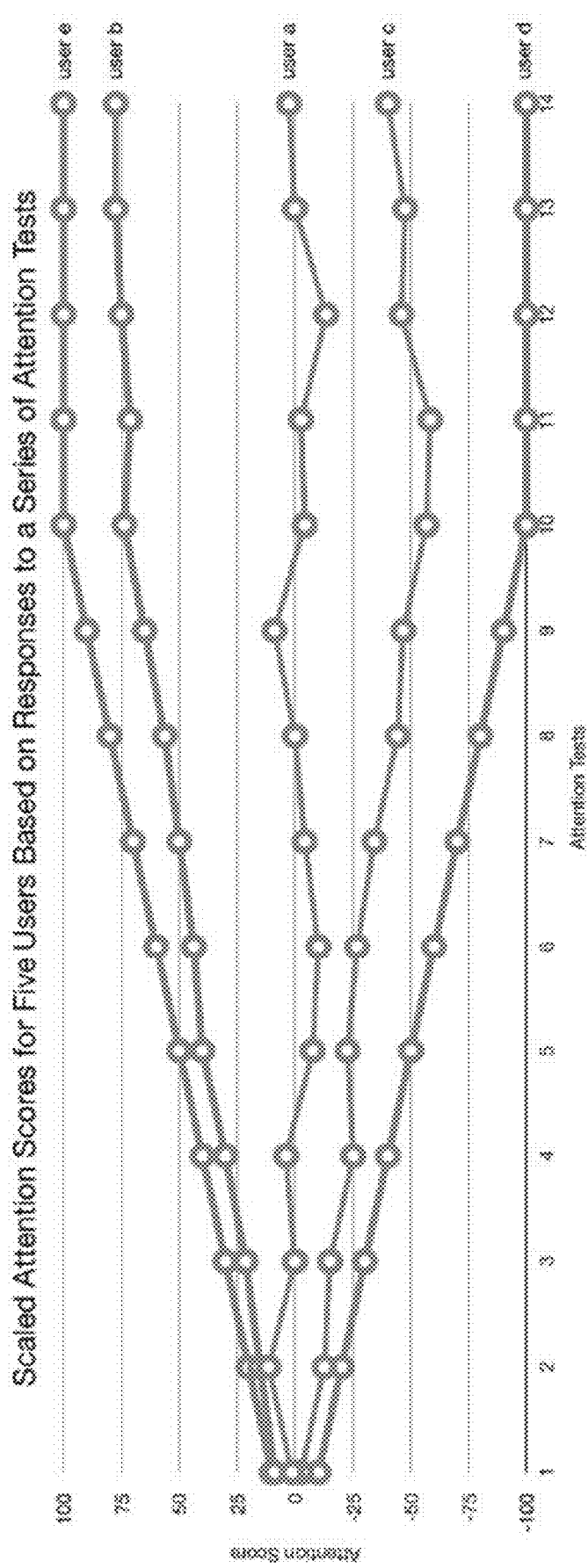
FIG. 10 is a line graph of TABLE IV, according to some example embodiments.

FIG. 10 is a line graph of TABLE IV, according to some example embodiments. Because the attention scores are based on aggregates, they all start near zero, with high attention score users and low attention score users diverging as attention test results accumulate.

FIG. 11 shows an equation for a Weibull distribution, according to some example embodiments.

FIG. 12 shows more statistical tables, according to some example embodiments. TABLE IX is a modified Weibull distribution for whole x values between 0 and 9, inclusive. The table is based on the Weibull formula shown in FIG. 12, using parameters (symbolized by a and b) specified in TABLE VIII. The distribution is modified in two ways: first, by truncating the distribution after 9 to eliminate the long tail; second, by using the zero x-value as a plug, forcing the cumulative distribution to equal 1.0000.

TABLE VII contains a distribution of attention test start times for attention scores between 100 and −100, plus a fixed start time for new users. The attention score-based start time distributions are calculated by first reversing the direction of the modified Weibull distribution (TABLE IX) to produce a leftward skew; and second, by applying the modified Weibull distribution to a range extending between a buffer at the earliest end and a maximum time at the latest end. The buffer is designed to prevent any immediate attention tests, however unlikely, in the 10-15 seconds immediately following a successful attention test. The maximum time is to ensure that an attention test is conducted before too much time has elapsed.

Figure 13A:
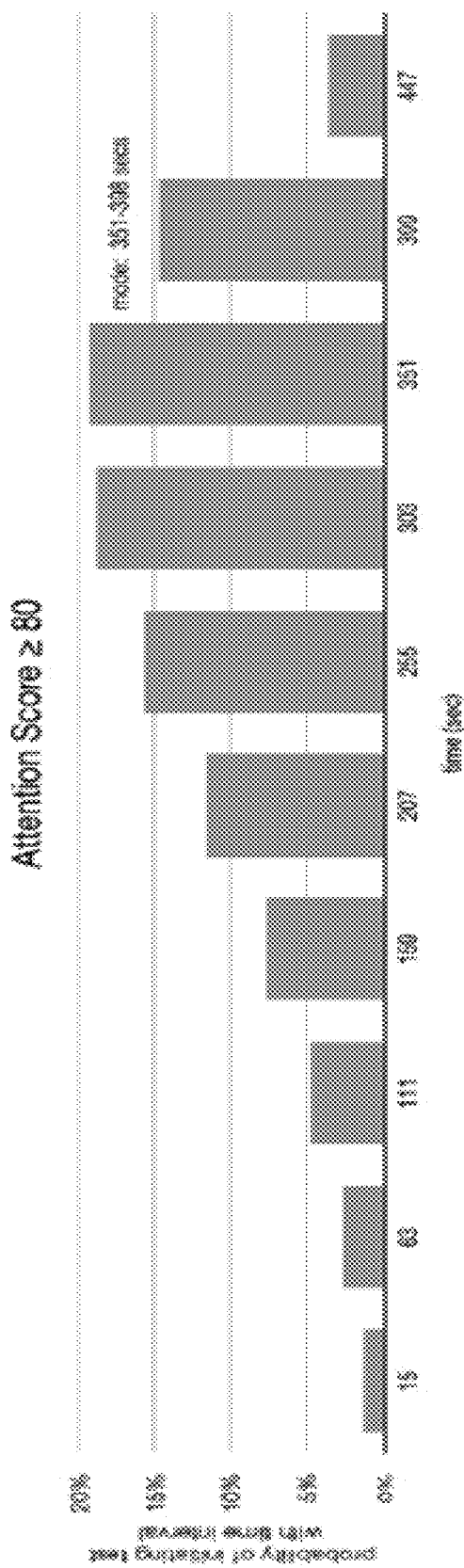
FIGS. 13A-13D show probability of an attention test being initiated at different time intervals based on attention score, according to some example embodiments.
Figure 13B:
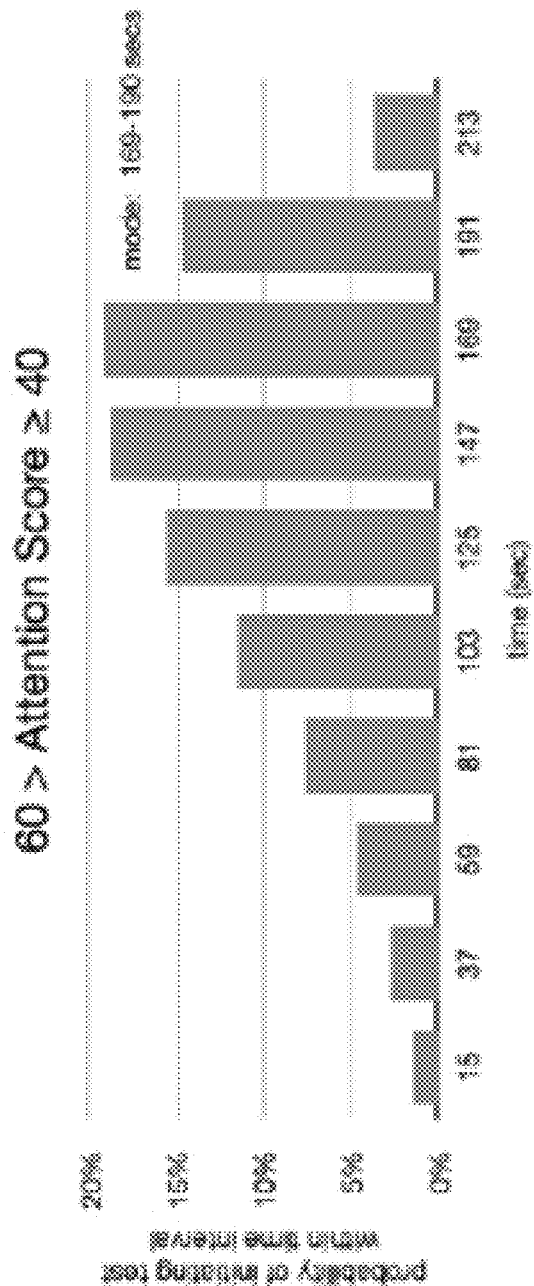
Figure 13C:
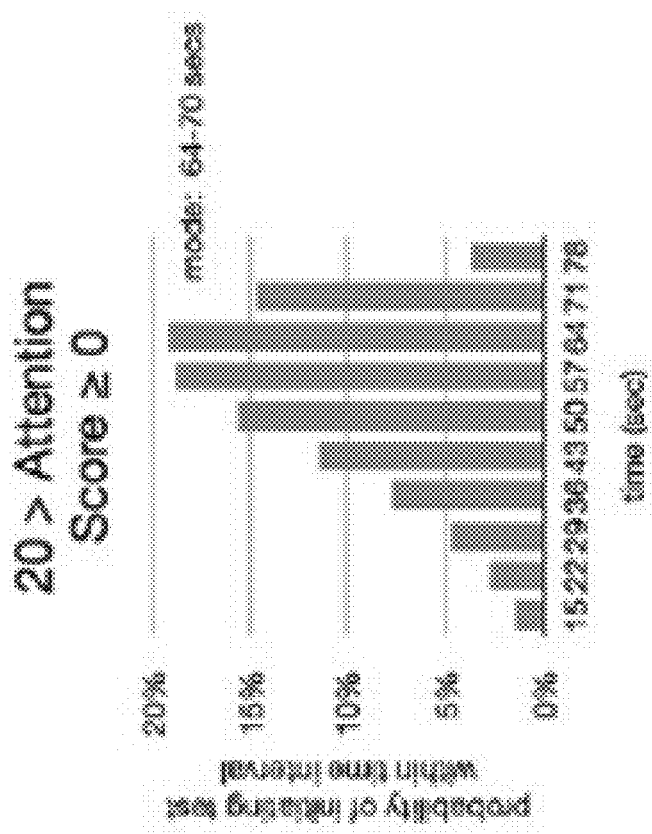
Figure 13D:
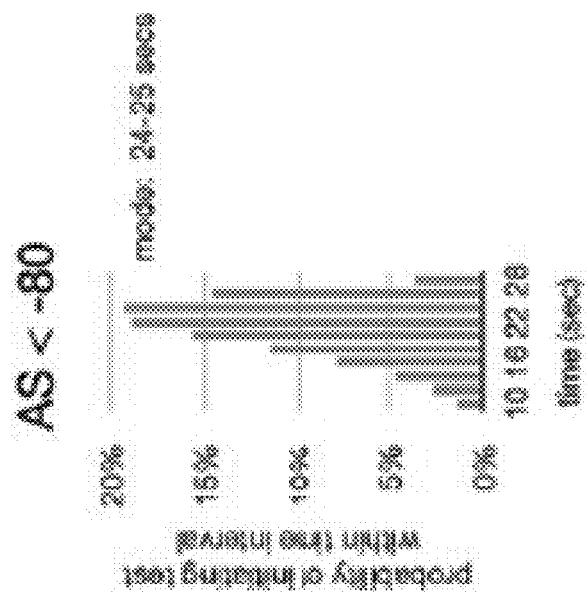

FIGS. 13A-13D show probability of an attention test being initiated at different time intervals based on attention score, according to some example embodiments. FIGS. 13A-13D show how the distribution would be applied for users falling within four attention score intervals of 20 points each. The purpose of the distribution is to, first, reward users with high attention scores (e.g., levels of attention) by challenging them with attention tests less frequently than those with low attention scores; second, to make the attention test unexpected; third, to maintain the possibility of an attention test soon after the buffer period; and, fourth, to shift the probability to the later end of the range. For example, the most attentive users would have attention scores of at least 80 (FIG. 13A). The mode of these users (19.2%) would see an attention test start at around six minutes, although a few users (1.4%) would see an attention test within the first minute. Conversely, the least attentive users would have attention scores lower than −80 (FIG. 13D). The mode of these users (19.2%) would see an attention test start at from 24 to 25 seconds and every user within this attention score range would see an attention test within 28 seconds. Similarly, the mode of the users that fall within these ends are shown in FIG. 13B and FIG. 13C.

What follows is a example of how the described embodiment might operate and is not intended to foreclose the nearly infinite operational combinations that would inevitably flow from variations in user behavior, design decisions, system parameters, and deliberate randomness built into when and how attention tests appear.

A user accepts an invitation to watch an advertisement (e.g., content) on his tablet computer in exchange for a reward. This is the first time he has participated in an exercise like this, making him a new user. Forty-five seconds into the ad, an animated bee appears at one point on the edge of his display (e.g., randomized entry point) and meanders around the screen (e.g., randomized path of travel). The bee's wings are vibrating, attracting notice, and the bee itself appears in contrasting colors so it shows up against the ad. A contrail, also in contrasting colors and showing a translucency gradient that gives the effect of quickly dissipating, extends an inch or so behind the bee. A few seconds after the appearance of the bee, an annotation appears near the bee that instructs the user to tap the bee to confirm attention.

The user taps the bee after 3 seconds, hitting the contact area, and the bee jumps a bit, changes direction, and moves quickly and with a blurred visual effect toward a near edge of the display (i.e., exit path). At the screen location where he tapped the bee, "+2" briefly appears.

The user watches two other ads like this a few days later. No bee appears during the first ad, but in the early seconds of the second ad the bee makes an appearance from a different edge of the display. It meanders around again, but doesn't show the annotation. The user taps it nonetheless after 7 seconds. The bee again departs. No points appear where it was tapped, in this case, because the user's response was sufficiently slow that he lost a few points.

A few ads later, the user looks away from the screen for about 15 seconds. When he returns his attention to the screen, he notices the bee leaving the screen. Ten seconds later, the bee appears again and this time the instructing annotation appears. This time, the user tapped the bee almost immediately, causing the bee to exit and "+4" to appear.

Over time, the user notices that the attention tests become generally infrequent, although he never knows when the bee might make its appearance. This is intended on motivating him to pay attention to the screen.

Although a tablet computer is one way to receiving touchscreen inputs, other ways include smartphones, smartwatches, touchscreen laptop computers, touchscreen desktop computers, touchscreen network computers, and touchscreen kiosks.

Although a video advertisement is one form of content, other forms include homework assignments, reading assignments, movie assignments, certification tests, safety instructions, crowdsourced content reviews, security monitoring displays, navigational displays, political messages, public service announcements, and compliance training.

Although a reward can be given in exchange for viewing content, it doesn't have to be.

Although a prompt object is one method for indicating the start of an attention test, other methods include flashes or beams of light; changes in screen or screen object hue, brightness, or saturation; changes in screen or screen object shape or size; audible sounds; vibrations; alerts; and text appearances.

Although an animated bee is one example of a prompt object, alternative embodiments include the consistent, rotating, or random use of animated or non-animated representations of the following: ladybugs, butterflies, spiders, frogs, or wasps; other insects; other arthropods; other animals; representations of political figures, celebrities, villains, enemies, friends, or family; cartoon figures; action figures; road signs; brand logos; emoticons; candy; targets; glassware; origami; pifitatas; comets; emergency flashers; other common objects; geometric shapes; and shapes enclosing instructional text.

Another embodiment consists of a highly translucent, small, pulsating circle that appears at a random point superimposed over the content, growing in size and increasing in opacity over a prescribed timeframe, and in which is visible the words, "Tap to dismiss" along with a countdown. If the user doesn't tap the circle within the prescribed timeframe, it disappears.

Although having a prompt object enter at a point on the viewable edge of the screen is one way to initiate an attention test, alternative methods employ different entry points, including other points on the screen; content objects; logos; screen locations related to current or past gaze direction; and screen objects designated for spawning.

Although selecting from a library of speed-changing, direction-changing flight paths is one way to move the prompt object across the screen during an attention test, alternative methods use different entrance paths including those that are straight; sporadic; random; jerky; bouncing; swinging; looping; video game-like; arcade game-like; amusement park-like; recurrent; zigzag; of constant speed; dynamically-generated; color-sensitive; contrast-sensitive; screen object-sensitive; ambient light-sensitive; sensitive to the user's gaze direction; mathematically generated; pulsating; leaping; and fixed with no entrance path.

Although touching a contact area that envelopes a prompt object is one way to signify attention, alternative methods include touching away from the prompt object; multi-touch gestures on or away from the prompt object; swipes; manipulating graphical objects such as slingshots, guns, cannons, bows, catapults, maces, wrecking balls, lion cages, buckets of molten lava, in order to hit, hammer, shoot, erase, pierce, squish, melt, boil, scald, maul, or otherwise directly or indirectly connect with a prompt object or other target; tapping in a code; and touching a series of visible or describable screen locations in combination or succession.

Although having a prompt object become translucent and speed directly away is one way to signify the completion of an attention test, alternative methods change various aspects of this, such as: different exit animations applied to the prompt object (e.g., exploding; dissolving; immolating; crushing; changing into a solid, liquid, or gaseous state; dying; changing color; dancing; running; tumbling; transmogrifying; rolling; shrinking; expanding; setting off fireworks; showering with sparks; swimming; pulsating; undulating; shooting off lasers; fading; twinkling; whirling; spinning; disappearing; and displaying a message to the user), different exit paths for the prompt object (e.g., curved; looping; spiraling; zigzag; random; indirect; reversed; visually-orthogonal to the horizontal surface of the screen; adaptations on alternative entrance paths; and no exit path), different exit contrails (e.g., sparks; fire; solid or dashed lines; curved or straight lines; arrows; footprints; slime tracks; furrowed earth; tire marks; smoke; and streams of goo), and different translucency levels (e.g., high translucency, low translucency, no translucency).

Although taking account of previous tests of attention through an attention score is one way to determine when future attention tests will occur, alternative methods do not require an attention score, including fixed time intervals, set schedules, intervals based on characteristics of the content, intervals based on other characteristics of the user, and completely random selection within a time interval.

Although the attention score is calculated and normalized a certain way, other ways to take into account historical attention will be readily apparent to those versed in applied math, including variations on the number of historical data points used; how to weight those data points; how to incorporate other indicators of attention, such as pupil dilation, skin impedance and gaze direction; how to score a failed test; how to score a failed retest; what constitutes a reasonable response time; how to score responses that deviate in any way from what is considered a reasonable response time; how to handle outliers; how to handle users with no or limited historical attention data; and how to identify diurnal, cyclical, or periodic patterns in response characteristics.

Although presenting positive reinforcement and avoiding negative reinforcement is one way to motivate users, other methods including avoiding any reinforcement whatsoever, providing both positive and negative reinforcement, and providing only negative reinforcement.

Although presenting the user with the points earned through a quick response is one way to provide positive reinforcement, other methods include displaying stars, fireworks, affirming messages, and emoticons; positive characteristics of the prompt object itself such as a smile or thumbs up; haptic feedback; sounds, songs, or spoken messages; and an historical accounting of points earned.

Although avoiding negative reinforcement is one way to implement the system, other methods include negative feedback such as displaying points lost; emoticons associated with negative emotions: other images of objects associated with negative emotions; scolding language; ominous or woeful sounds; and screen effects associated with negative experiences.

Although the example given uses touchscreen interaction to indicate attention only, alternative methods could capture the touchscreen interaction in the course of providing other user inputs, including user authentication, user opinions, user preferences, and user engagement with the content.

Although applying a random number to a buffered, modified, negative Weibull distribution is one way to set the time for an upcoming attention test, other methods include removing the buffer; using non-random numbers; not modifying the distribution; using different scale, shape, and exponent values; and using different distributions like normal, Gaussian, Cauchy, Laplace, Poisson, exponential, binomial, beta, gamma, and step functions.

Although a Weibull distribution with the parameters shown in TABLE VIII and the modifications that result in TABLE IX is one way to weight the attention test start interval probabilities, other methods include different shape, scale, threshold, buffer, and granularity decisions.

Although aggregating the last ten values is one way to provide an intermediate input into an attention score, other methods include other aggregations, weighted or unweighted, for any number or pattern of historical data points.

Although assigning different buffer and maximum times to different bands of attention scores, such as those listed in TABLE VII, is one way to assign start intervals, other methods include purely mathematical expressions of buffer variation, maximum time variation, and attention score assignment.

Software Architecture

Figure 14:
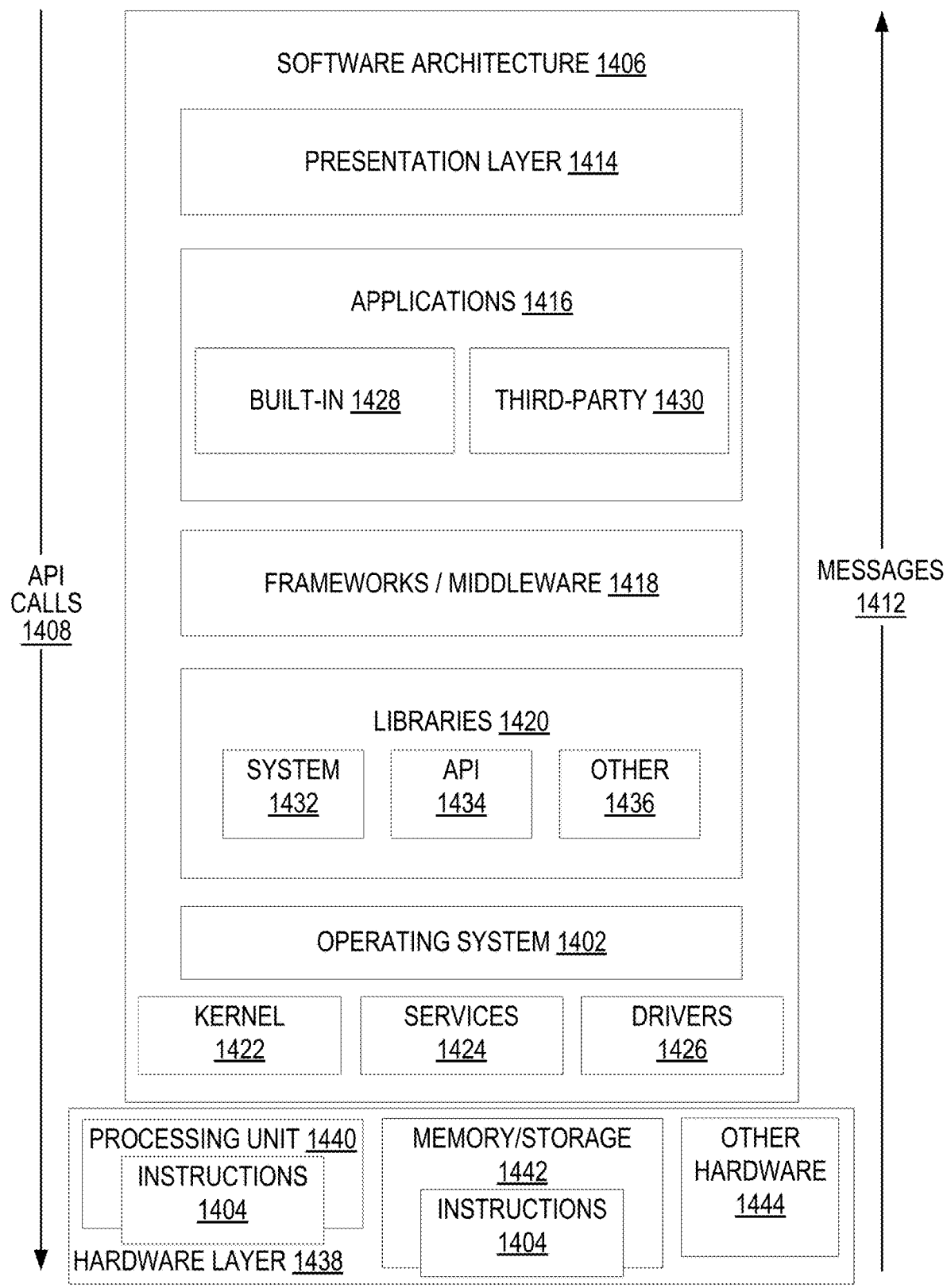
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating an example software architecture 1406, which may be used in conjunction with various hardware architectures herein described. FIG. 14 is a non-limiting example of a software architecture 1406 and it will be appreciated that many other architectures may be implemented to facilitate the functionality described herein. The software architecture 1406 may execute on hardware such as machine 1500 of FIG. 15 that includes, among other things, processors 1504, memory 1514, and (input/output) I/O components 1518. A representative hardware layer 1438 is illustrated and can represent, for example, the machine 1500 of FIG. 15. The representative hardware layer 1438 includes a processing unit 1440 having associated executable instructions 1404. Executable instructions 1404 represent the executable instructions of the software architecture 1406, including implementation of the methods, components, and so forth described herein. The hardware layer 1438 also includes memory and/or storage modules 1442, which also have executable instructions 1404. The hardware layer 1438 may also comprise other hardware 1444.

In the example architecture of FIG. 14, the software architecture 1406 may be conceptualized as a stack of layers where each layer provides particular functionality. For example, the software architecture 1406 may include layers such as an operating system 1402, libraries 1420, frameworks/middleware 1418, applications 1416, and a presentation layer 1414. Operationally, the applications 1416 and/or other components within the layers may invoke application programming interface (API) calls 1408 through the software stack and receive a response such as messages 1412 in response to the API calls 1408. The layers illustrated are representative in nature and not all software architectures have all layers. For example, some mobile or special purpose operating systems may not provide a frameworks/middleware 1418, while others may provide such a layer. Other software architectures may include additional or different layers.

The operating system 1402 may manage hardware resources and provide common services. The operating system 1402 may include, for example, a kernel 1422, services 1424, and drivers 1426. The kernel 1422 may act as an abstraction layer between the hardware and the other software layers. For example, the kernel 1422 may be responsible for memory management, processor management (e.g., scheduling), component management, networking, security settings, and so on. The services 1424 may provide other common services for the other software layers. The drivers 1426 are responsible for controlling or interfacing with the underlying hardware. For instance, the drivers 1426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1420 provide a common infrastructure that is used by the applications 1416 and/or other components and/or layers. The libraries 1420 provide functionality that allows other software components to perform tasks in an easier fashion than to interface directly with the underlying operating system 1402 functionality (e.g., kernel 1422, services 1424, and/or drivers 1426). The libraries 1420 may include system libraries 1432 (e.g., C standard library) that may provide functions such as memory allocation functions, string manipulation functions, mathematical functions, and the like. In addition, the libraries 1420 may include API libraries 1434 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1420 may also include a wide variety of other libraries 1436 to provide many other APIs to the applications 1416 and other software components/modules.

The frameworks/middleware 1418 (also sometimes referred to as middleware) provide a higher-level common infrastructure that may be used by the applications 1416 and/or other software components/modules. For example, the frameworks/middleware 1418 may provide various graphical user interface (GUI) functions, high-level resource management, high-level location services, and so forth. The frameworks/middleware 1418 may provide a broad spectrum of other APIs that may be used by the applications 1416 and/or other software components/modules, some of which may be specific to a particular operating system 1402 or platform.

The applications 1416 include built-in applications 1428 and/or third-party applications 1430. Examples of representative built-in applications 1428 may include, but are not limited to, a contacts application, a browser application, a book reader application, a location application, a media application, a messaging application, and/or a game application. Third-party applications 1430 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1430 may invoke the API calls 1408 provided by the mobile operating system (such as operating system 1402) to facilitate functionality described herein.

The applications 1416 may use built in operating system functions (e.g., kernel 1422, services 1424, and/or drivers 1426), libraries 1420, and frameworks/middleware 1418 to create UIs to interact with users of the system. Alternatively, or additionally, in some systems, interactions with a user may occur through a presentation layer, such as presentation layer 1414. In these systems, the application/component "logic" can be separated from the aspects of the application/component that interact with a user.

Figure 15:
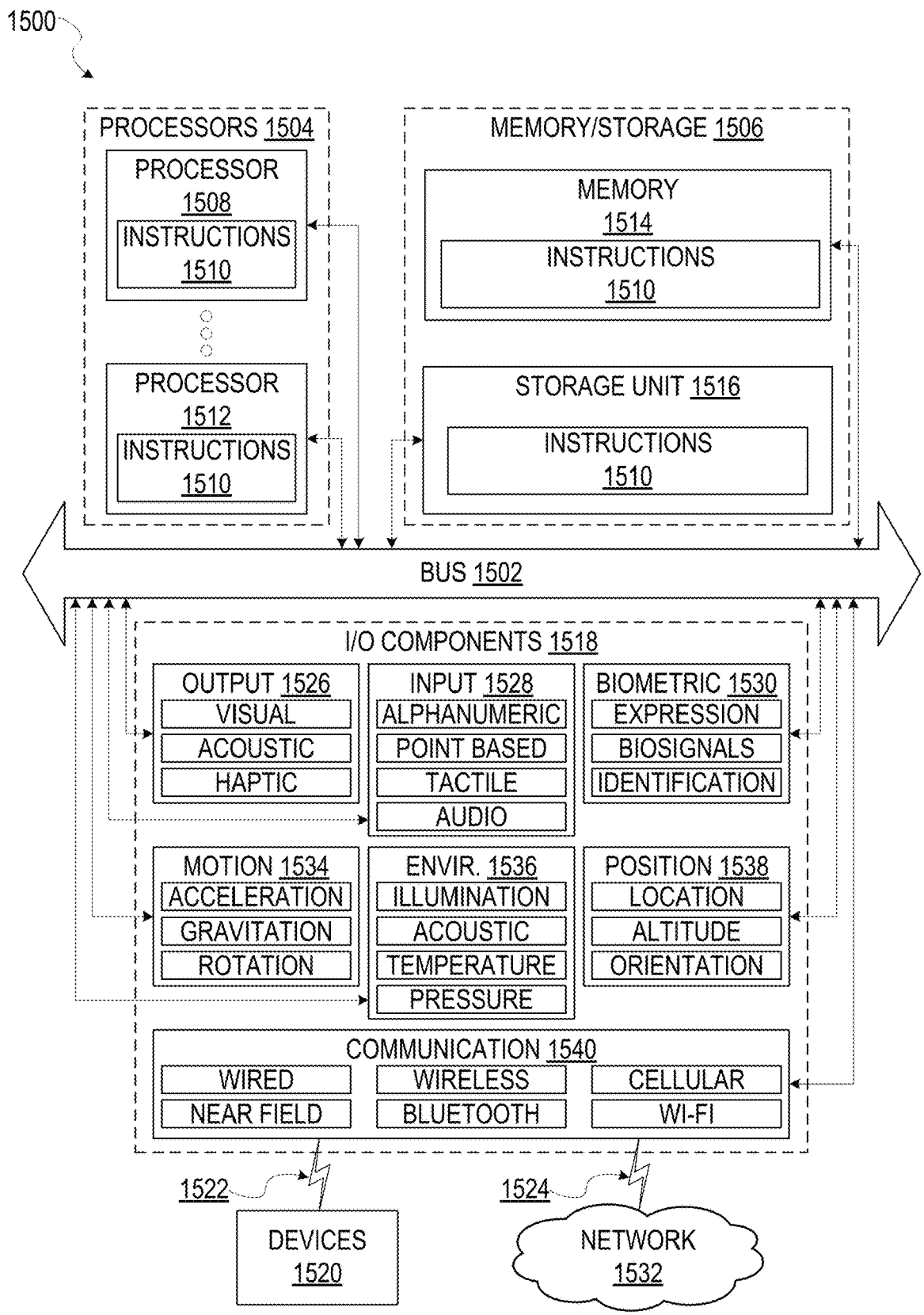
FIG. 15 is a block diagram illustrating components of a machine, according to some example embodiments, able to read instructions from a machine-readable medium (e.g., a machine-readable storage medium) and perform any one or more of the methodologies discussed herein.

FIG. 15 is a block diagram illustrating components of a machine 1500, according to some example embodiments, able to read instructions 1404 from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1510 (e.g., software, a program, an application, an applet, an app, or other executable code) for causing the machine 1500 to perform any one or more of the methodologies discussed herein may be executed. As such, the instructions 1510 may be used to implement modules or components described herein. The instructions 1510 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1500 capable of executing the instructions 1510, sequentially or otherwise, that specify actions to be taken by machine 1500. Further, while only a single machine 1500 is illustrated, the term "machine" shall also be taken to include a collection of machines that individually or jointly execute the instructions 1510 to perform any one or more of the methodologies discussed herein.

The machine 1500 may include processors 1504, memory/storage 1506, and I/O components 1518, which may be configured to communicate with each other such as via a bus 1502. The memory/storage 1506 may include a memory 1514, such as a main memory, or other memory storage, and a storage unit 1516, both accessible to the processors 1504 such as via the bus 1502. The storage unit 1516 and memory 1514 store the instructions 1510 embodying any one or more of the methodologies or functions described herein. The instructions 1510 may also reside, completely or partially, within the memory 1514, within the storage unit 1516, within at least one of the processors 1504 (e.g., within the processor's cache memory), or any suitable combination thereof, during execution thereof by the machine 1500. Accordingly, the memory 1514, the storage unit 1516, and the memory of processors 1504 are examples of machine-readable media.

The I/O components 1518 may include a wide variety of components to receive input, provide output, produce output, transmit information, exchange information, capture measurements, and so on. The specific I/O components 1518 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1518 may include many other components that are not shown in FIG. 15. The I/O components 1518 are grouped according to functionality merely for simplifying the following discussion and the grouping is in no way limiting. In various example embodiments, the I/O components 1518 may include output components 1526 and input components 1528. The output components 1526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1528 may include alphanumeric input components (e.g., a keyboard, a touch screen configured to receive alphanumeric input, a photo-optical keyboard, or other alphanumeric input components), point based input components (e.g., a mouse, a touch screen, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1518 may include biometric components 1530, motion components 1534, environmental components 1536, or position components 1538 among a wide array of other components. For example, the biometric components 1530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1534 may include acceleration sensor components (e.g., accelerometer), gravitation sensor components, rotation sensor components (e.g., gyroscope), and so forth. The environmental components 1536 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1538 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1518 may include communication components 1540 operable to couple the machine 1500 to a network 1532 or devices 1520 via coupling 1524 and coupling 1522, respectively. For example, the communication components 1540 may include a network interface component or other suitable device to interface with the network 1532. In further examples, communication components 1540 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1520 may be another machine or any of a wide variety of peripheral devices (e.g., a peripheral device coupled via a USB).

Moreover, the communication components 1540 may detect identifiers or include components operable to detect identifiers. For example, the communication components 1540 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1510 for execution by the machine 1500, and includes digital or analog communications signals or other intangible medium to facilitate communication of such instructions 1510. Instructions 1510 may be transmitted or received over the network 1532 using a transmission medium via a network interface device and using any one of a number of well-known transfer protocols.

"CLIENT DEVICE" in this context refers to any machine 1500 that interfaces to a communications network 1532 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1532.

"COMMUNICATIONS NETWORK" in this context refers to one or more portions of a network 1532 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1532 or a portion of a network 1532 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1510 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1510. The term "machine-readable medium" shall also be taken to include any medium, or combination of multiple media, that is capable of storing instructions 1510 (e.g., code) for execution by a machine 1500, such that the instructions 1510, when executed by one or more processors 1504 of the machine 1500, cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1504) may be configured by software (e.g., an application 1416 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1504 or other programmable processor 1504. Once configured by such software, hardware components become specific machines 1500 (or specific components of a machine 1500) uniquely tailored to perform the configured functions and are no longer general-purpose processors 1504. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1504 configured by software to become a special-purpose processor, the general-purpose processor 1504 may be configured as respectively different special-purpose processors (e.g., comprising different hardware components) at different times. Software accordingly configures a particular processor or processors 1504, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1502) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1504 that are temporarily configured (e.g., by software) or permanently configured to perform the relevant operations. Whether temporarily or permanently configured, such processors 1504 may constitute processor-implemented components that operate to perform one or more operations or functions described herein. As used herein, "processor-implemented component" refers to a hardware component implemented using one or more processors 1504. Similarly, the methods described herein may be at least partially processor-implemented, with a particular processor or processors 1504 being an example of hardware. For example, at least some of the operations of a method may be performed by one or more processors 1504 or processor-implemented components. Moreover, the one or more processors 1504 may also operate to support performance of the relevant operations in a "cloud computing" environment or as a "software as a service" (SaaS). For example, at least some of the operations may be performed by a group of computers (as examples of machines 1500 including processors 1504), with these operations being accessible via a network 1532 (e.g., the Internet) and via one or more appropriate interfaces (e.g., an API). The performance of certain of the operations may be distributed among the processors 1504, not only residing within a single machine 1500, but deployed across a number of machines 1500. In some example embodiments, the processors 1504 or processor-implemented components may be located in a single geographic location (e.g., within a home environment, an office environment, or a server farm). In other example embodiments, the processors 1504 or processor-implemented components may be distributed across a number of geographic locations.

"PROCESSOR" in this context refers to any circuit or virtual circuit (a physical circuit emulated by logic executing on an actual processor 1504) that manipulates data values according to control signals (e.g., "commands," "op codes," "machine code," etc.) and which produces corresponding output signals that are applied to operate a machine 1500. A processor 1504 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1504 may further be a multi-core processor having two or more independent processors 1504 (sometimes referred to as "cores") that may execute instructions 1510 contemporaneously.

What is claimed is:

1. A method comprising:
    while content is being presented by a client device, causing presentation of a latest prompt object on a display of the client device, the latest prompt object starting from a first entry point and traversing a first path across the display at a speed such that the latest prompt object traverses a first portion of the first path at a first speed and the latest prompt object traverses a second portion of the first path at a second speed that is different than the first speed, the first path including at least one curve;
    while the latest prompt object is traversing the first path across the display, detecting a user input at a point on the display that is within a threshold distance of a current position of the latest prompt object along the first path;
    determining an updated attention score that indicates a current attention level of a user of the client device based on the user input, the determining of the updated attention score based on the user input comprising determining a percentage of interactions which the user successfully performed a specified interaction in response to the user being presented with past prompt objects, the past prompt objects including the latest prompt;
    determining a future time at which to present a subsequent prompt object based on the updated attention score, the determining of the future time comprising:
        applying a random number, to a time interval distribution corresponding to the updated attention score, to determine the future time; and
    causing presentation of the subsequent prompt object on the display of the client device at the future time.

2. The method of claim 1, wherein the first entry point is determined at random using a random entry point generation algorithm.

3. The method of claim 1, wherein the subsequent prompt object starts from a second entry point and traverses a second path across the display, the second entry point being different than the first entry point and the second path being different than the first path.

4. The method of claim 3, further comprising:
while the subsequent prompt object is traversing the second path across the display, detecting a second user input at a second point on the display that is within a threshold distance of a current position of the subsequent prompt object along the second path; and
determining an updated attention level of the user based on the second user input.

5. The method of claim 3, further comprising:
determining that a timeout occurred in relation to the subsequent prompt object based on a threshold period of time having elapsed without detecting a user input within the threshold distance of the subsequent prompt object as it traversed along the second path; and
determining an updated attention level of the user based on occurrence of the timeout.

6. The method of claim 3, wherein the first path and the second path conform to a defined set of path rules, the defined set of path rules defining at least a first region of the display through which a generated path is to overlap.

7. The method of claim 1, wherein determining the current attention level of the user comprises:
determining, based on the user input and historical user inputs of the user to previously presented prompt objects, a successful response rate of the user to presented prompt objects; and
determining the current attention level of the user based on the successful response rate of the user.

8. The method of claim 7, wherein determining the successful response rate of the user comprises:
determining a subset of historical user inputs of the user that fall within a specified period of time, wherein the successful response rate of the user is determined based on the subset of historical user inputs.

9. A system comprising:
one or more computer processors; and
one or more computer-readable mediums storing instructions that, when executed by the one or more computer processors, cause the system to perform operations comprising:
while content is being presented by a client device, causing presentation of a latest prompt object on a display of the client device, the latest prompt object starting from a first entry point and traversing a first path across the display at a speed such that the latest prompt object traverses a first portion of the first path at a first speed and the latest prompt object traverses a second portion of the first path at a second speed that is different than the first speed, the first path including at least one curve;
while the latest prompt object is traversing the first path across the display, detecting a user input at a point on the display that is within a threshold distance of a current position of the latest prompt object along the first path;
determining an updated attention score that indicates a current attention level of a user of the client device based on the user input, the determining of the updated attention score based on the user input comprising determining a percentage of interactions which the user successfully performed a specified interaction in response to the user being presented with past prompt objects, the past prompt objects including the latest prompt;
determining a future time at which to present a subsequent prompt object based on the updated attention score, the determining of the future time comprising:
applying a random number, to a time interval distribution corresponding to the updated attention score, to determine the future time; and
causing presentation of the subsequent prompt object on the display of the client device at the future time.

10. The system of claim 9, wherein the first entry point is determined at random using a random entry point generation algorithm.

11. The system of claim 9, wherein the subsequent prompt object starts from a second entry point and traverses a second path across the display, the second entry point being different than the first entry point and the second path being different than the first path.

12. The system of claim 11, the operations further comprising:
while the subsequent prompt object is traversing the second path across the display, detecting a second user input at a second point on the display that is within a threshold distance of a current position of the subsequent prompt object along the second path; and
determining an updated attention level of the user based on the second user input.

13. The system of claim 11, the operations further comprising:
determining that a timeout occurred in relation to the subsequent prompt object based on a threshold period of time having elapsed without detecting a user input within the threshold distance of the subsequent prompt object as it traversed along the second path; and
determining an updated attention level of the user based on occurrence of the timeout.

14. The system of claim 11, wherein the first path and the second path conform to a defined set of path rules, the defined set of path rules defining at least a first region of the display through which a generated path is to overlap.

15. The system of claim 9, wherein determining the current attention level of the user comprises:
determining, based on the user input and historical user inputs of the user to previously presented prompt objects, a successful response rate of the user to presented prompt objects; and
determining the current attention level of the user based on the successful response rate of the user.

16. A non-transitory computer-readable medium storing instructions that, when executed by one or more computer processors of one or more computing devices, cause the one or more computing devices to perform operations comprising:
while content is being presented by a client device, causing presentation of a latest prompt object on a display of the client device, the latest prompt object starting from a first entry point and traversing a first path across the display at a speed such that the latest prompt object traverses a first portion of the first path at a first speed and the latest prompt object traverses a second portion of the first path at a second speed that is different than the first speed, the first path including at least one curve;
while the latest prompt object is traversing the first path across the display, detecting a user input at a point on the display that is within a threshold distance of a current position of the latest prompt object along the first path;

determining an updated attention score that indicates a current attention level of a user of the client device based on the user input, the determining of the updated attention score based on the user input comprising determining a percentage of interactions which the user successfully performed a specified interaction in response to the user being presented with past prompt objects, the past prompt objects including the latest prompt;

determining a future time at which to present a subsequent prompt object based on the updated attention score, the determining of the future time comprising:
  applying a random number, to a time interval distribution corresponding to the updated attention score, to determine the future time; and causing presentation of the subsequent prompt object on the display of the client device at the future time.

* * * * *